(12) United States Patent
Ceusters et al.

(10) Patent No.: US 7,917,354 B2
(45) Date of Patent: Mar. 29, 2011

(54) CONCEPTUAL WORLD REPRESENTATION NATURAL LANGUAGE UNDERSTANDING SYSTEM AND METHOD

(75) Inventors: Werner Ceusters, Zonnegem (BE);
Mick O'Donnell, Tres Cantos (ES);
Frank Montyne, Deurle (BE); Frederik Coppens, Haaltert (BE); Maarten Van Mol, Holsbeek (BE)

(73) Assignee: Nuance Communications, Inc., Burlington, MA (US)

( * ) Notice: Subject to any disclaimer, the term of this patent is extended or adjusted under 35 U.S.C. 154(b) by 64 days.

(21) Appl. No.: 12/371,084

(22) Filed: Feb. 13, 2009

(65) Prior Publication Data
US 2009/0259459 A1    Oct. 15, 2009

Related U.S. Application Data

(63) Continuation of application No. 10/193,886, filed on Jul. 12, 2002, now Pat. No. 7,493,253.

(51) Int. Cl.
G06F 17/27 (2006.01)
G06F 17/00 (2006.01)
G06F 17/30 (2006.01)
G06F 7/00 (2006.01)

(52) U.S. Cl. .............. 704/9; 706/46; 707/741; 707/797; 707/798

(58) Field of Classification Search .................. None
See application file for complete search history.

(56) References Cited

U.S. PATENT DOCUMENTS

| | | | |
|---|---|---|---|
| 5,794,050 A * | 8/1998 | Dahlgren et al. | 717/144 |
| 6,061,675 A * | 5/2000 | Wical | 706/45 |
| 6,675,159 B1 * | 1/2004 | Lin et al. | 1/1 |
| 6,766,316 B2 * | 7/2004 | Caudill et al. | 1/1 |
| 7,027,974 B1 * | 4/2006 | Busch et al. | 704/4 |
| 2002/0059289 A1 * | 5/2002 | Wenegrat et al. | 707/102 |

* cited by examiner

*Primary Examiner* — Matthew J Sked
(74) *Attorney, Agent, or Firm* — Wolf, Greenfield & Sacks, P.C.

(57) ABSTRACT

A Natural Language Understanding system is provided for indexing of free text documents. The system according to the invention utilizes typographical and functional segmentation of text to identify those portions of free text that carry meaning. The system then uses words and multi-word terms and phrases identified in the free to text to identify concepts in the free text. The system uses a lexicon of terms linked to a formal ontology that is independent of a specific language to extract concepts from the free text based on the words and multi-word terms in the free text. The formal ontology contains both language independent domain knowledge concepts and language dependent linguistic concepts that govern the relationships between concepts and contain the rules about how language works. The system according to the current invention may preferably be used to index medical documents and assign codes from independent coding systems, such as, SNOMED, ICD-9 and ICD-10. The system according to the current invention may also preferably make use of syntactic parsing to improve the efficiency of the method.

2 Claims, 10 Drawing Sheets

| | |
|---|---|
| Head: | [Head] |
| Presentation_problem: | DATE OF INJURY: 10-98. |
| Anamnesis: | This patient was seen by Dr. [Name] at PRC with bilateral wrist pain on 10-98. She states that both hands have been quite painful and numb. She was treated with physical therapy and was wearing cock-up splints at night, not wearing splints during the day time. There is no history of neck, shoulder, elbow injury. |
| Systemic_anamnesis: | FOCAL REVIEW OF SYSTEMS: There is no weakness, there are no sensory or muscular changes not associated with the upper extremity. SHE IS ALLERGIC TO PENICILLIN AND CODEINE. |
| Clinical_examination: | PHYSICAL EXAMINATION: Reveals full range of motion over her neck. There is no tenderness over the brachial plexus. There is no axial tenderness. Full range of motion of the shoulders with no tenderness over the rotator cuff or bicipital tendon. No weakness. She is tender over the right lateral epicondyle. She, however, does not have accentuation of her pain on forced extension. She has little shooting pain if pressure is placed over the ulnar nerve in both hands. The Tinel and Phalen are both negative. The Finkelstein is negative. |

FIG. 9

CONCEPTUAL WORLD REPRESENTATION NATURAL LANGUAGE UNDERSTANDING SYSTEM AND METHOD

CROSS-REFERENCE AND RELATED APPLICATIONS

This application is a continuation application of U.S. patent application Ser. No. 10/193,886 entitled "Conceptual World Representation Natural Language Understanding System And Method," filed Jul. 12, 2002 (now U.S. Pat. No. 7,493,253), which is incorporated herein by reference in its entirety.

REFERENCE TO COMPUTER PROGRAM LISTING SUBMITTED ON A COMPACT DISC

This application includes a compact disc appendix containing source code listings of instructions that when executed by, for example, a computer cause the computer to perform one or more embodiments described herein. The source code listings are included in the files identified in the Computer Program Listing Appendix of the specification, and the files of the source code listings are stored on a compact disc. Two identical copies of the compact disc (labeled "Copy 1" and "Copy 2") are hereby incorporated by reference. Specifically, the Computer Program Listing Appendix attached hereto contains a list of the file names, dates of creation, and size in bytes for the files contained within the master file "L&C" on each of the identical copies of the compact discs. At least the portions of the specification related to the source code listings contain material which is subject to copyright protection. The copyright owner has no objection to the facsimile reproduction of the specification as filed in the Patent and Trademark Office. Otherwise all copyright rights are reserved.

FIELD OF THE INVENTION

The present invention relates to a system and method for natural language understanding. More specifically, this invention relates to a formal ontology, independent of a specific language, used in natural language understanding and a corresponding method for indexing and coding free text documents wherein world representations and languages are exploited. More specifically, this invention relates to a formal ontology and lexicon of terms used to support a computer-based natural language understanding system and method for indexing and coding free text documents.

BACKGROUND

A significant amount of work has been done in the last 25 years in the area of natural language understanding. In its broadest terms natural language understanding encompasses processes by which documents in human readable form are processed to a computer readable form. Among the applications for natural language understanding are indexing and retrieval of free text documents, and coding of documents by subject matter. As manual methods are time-consuming, require highly trained individuals to review text, and are often inaccurate based on human error and inconsistent use of terms and codes, there is a strong desire to develop robust and reliable computer systems that can perform these tasks.

Current natural language understanding systems for indexing, coding, and retrieval of free text are time consuming and somewhat imprecise. Existing systems use conventional word matching or concept matching. These systems use only words or concepts, rather than concept extraction that is independent of language and terminology. For example, U.S. Pat. No. 4,868,733 to Fujisawa et al uses "concepts" represented by words, and links or "relations" between the "concepts." The concepts, however, are in reality words, or terms, arranged hierarchically such that certain terms subsume other terms.

U.S. Pat. No. 6,061,675 to Wical et al describes a knowledge catalog that stores different senses and forms of terms within static and dynamic ontologies for particular areas of knowledge (i.e. particular industries). The ontologies contain words that define terminology specific to different industries and fields of study. U.S. Pat. No. 4,815,005 to Oyanagi et al describes a main associative memory unit, or ontology, that stores knowledge "data", each piece of data consisting of an object, an attribute and a value. Each object is represented by a "node". Examples of objects are "bird", "tire" or "man." U.S. Pat. No. 4,967,371 to Muranaga et al describes a frame-based technology in which "objects" are represented by frames that store information related to the particular object. Additionally, objects can be connected to one another. This frame-based technology, however, remains reliant on words or terms that describe objects of interest and derives values for slots within particular frames such that only terms are interrelated in a hierarchical structure.

Of particular interest in the area of natural language understanding is the coding of medical language to allow consistent classification and storage of medical information using commercial and proprietary coding systems. Examples of methods that relate to systems for coding data are described in U.S. Pat. No. 5,809,476 to Ryan, and U.S. Pat. No. 6,292,771 to Haug et al.

All of the above systems share a common shortfall in that they rely on words and terms to define concepts in free text.

In order to know how to make computers better understand language, it is necessary to understand how language works. The way language works is based on the world view of users of language. A common representation of how language works is shown in FIG. 1. The diagram in FIG. 1 is commonly referred to as the semantic triangle. The three vertices of the semantic triangle represent the basic components that are commonly used to define how language works. At one vertex are words and terms, which in their broadest scope comprise language with all of its syntactic rules. At the second vertex are concepts, which in their totality make up the world view. World views are constrained by the physical capabilities of the human body to perceive reality. For example, the concept of color exists because most people can see colors. Finally, at the third vertex are the real world objects that are the focus of concepts and words. In totality, the sum of objects make up reality.

Concepts can be differentiated from words and language, and from real world objects by recognizing that a word or term is simply a label applied to the object or concept. Word and term formation are partially based on physical characteristics of the objects that they denote. For example, the words "bark" and "quack" mimic the sounds made by the animals denoted by the words. The concept is the sum of all of the definitions given to the object in a particular culture that applies the label to the object. For example, the label "dog" applies to a concept shared by people in English speaking countries about a particular real object. However, an individual can contemplate the notion of "dog" without having the physical object in front of him. Hence, the concept is disembodied from the real world object. Further, when presented with the particular object an individual can recognize it based on the concept of that object without appealing to the word or term used to label it. Thus the concept attached to "dog" is independent of the word as well.

It is well known that the words or terms used to refer to concepts/objects varies across cultures, because of the variety of languages that exist. However, it is also true that the concepts attached to real objects may vary across cultures as well. For example, in western culture, the concept for "dog" does not include the definition of being a food item, whereas in certain eastern cultures this definition is included in the concept. Functionally, the full definition given to a specific concept, such as "dog", in a given culture is understood by the totality of other concepts related to the specific concept. For example, a full definition of the concept "dog" may include the following related concepts:

Is an "animal"
Is a "pet"
Has "fur"
Has "sharp teeth"
Eats "meat"
Makes sound "barking"
Is owned by "person"

As can be seen from the example, the concepts that construct the full definition of a specific concept can indicate several aspects about the concept: 1) state of being (animal, pet), 2) physical qualities (fur, sharp teeth), 3) how it acts on other concepts (eats meat, barks) and how other concepts act on it (owned by person). Further, it can be seen that certain reciprocal relationships can exist between concepts. For example, the definition of the concept "dog" as something owned by a person implies the definition of the concept "person" as something that can own a dog.

The terms, or words selected in a particular language are used to express "concepts" which are notions of the "objects" that exist in our understanding of the world or "reality." However, humans do not understand language only as a collection of labels applied to concepts. For example, in the sentence:

"In China the people wear fur coats and regularly eat dog meat."

it is understood by the reader that "fur" and "eat meat" refer to qualities of the people, not the dog. Despite the conceptual relationship of these concepts to "dog", the syntactic structure of the sentence and knowledge of the way language works and of reality allows a human reader to extract a completely different meaning from the text. Additionally, a human reader is able to extract from this text the knowledge that the dog is most likely not a pet, even though this concept is not explicitly in the sentence. Further, a reader is able to discern that the sentence is related to the more general subject of garments and dietary habits of people in China.

For a computer based system to fully understand natural language, a combination of all three vertices of the semantic triangle must be used. Previous systems have relied on the relationship of words and groupings of words in free text to extract concepts from free text documents. This approach ignores the fact that concepts exist independent of language. Further, it limits the ability of previous systems to extract concepts that are not explicitly represented in the free text. Also importantly, by relying on words, word groupings and grammar to extract concepts from free text, previous systems lack the ability to index and code documents in more than one language.

It would therefore be desirable to develop a system of natural language understanding for a computer based system that uses both terms and concepts to provide a more accurate and thorough understanding of free text by extracting concepts to which words, terms or phrases are attached as known grammaticalisations in a specific language. For example, although words used in a sentence may be important and may relate to the particular topic(s) represented by the sentence, reaching a higher level of conceptual understanding and relationship between the words and their syntactic and semantic relationships to one another will help glean more information from the sentence that will permit more accurate and complete indexing, coding, and query analysis.

SUMMARY OF THE INVENTION

The present system and method offers an advantage over other natural language understanding systems and methods because the relationships between world representations and languages is exploited without having to build an entire grammar to support uses for the underlying ontology. The system understands the relationships between words semantically and syntactically, and also understands the relationships between concept-carrying blocks that the system doesn't necessarily already know, based on the location of the block in a sentence and the "concepts" represented by the blocks/text around it. Thus, the system transcends word and term matching as a method of indexing and retrieving information and creates a direct pipeline from language to reality without incurring machine translation. The world representation encompassed in the present system is one world representation understood over a number of different languages. The system is thus able to process and index documents in a variety of languages.

BRIEF DESCRIPTION OF THE DRAWINGS

FIG. 9 illustrates a sample output of functional segmentation of free text documents after sectioning and labeling.

DETAILED DESCRIPTION

Figure 1:
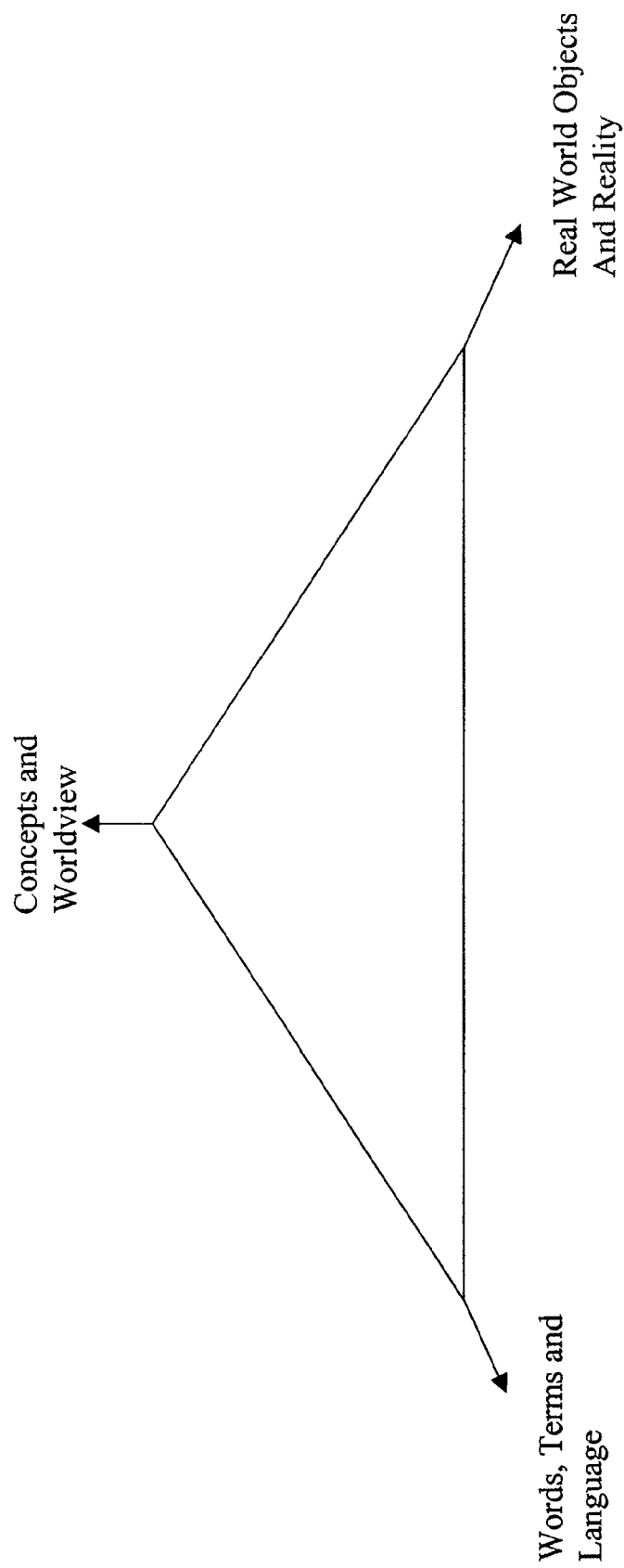
FIG. 1 is a depiction of the semantic triangle and the semantic triangle as adapted for the scope of the present invention.

The present invention provides a system and a method for the indexing of free text documents. Among the unique features of the system and method according to the current invention is the use of both language dependent terms and a language independent formal ontology of concepts to extract the deep meaning in free text documents.

The system according to the current invention is divided into two primary sections, each of which performs one of the two primary steps in the method according to the current invention. The first step of the method according to the current invention comprises the receipt by the system of a document to be indexed and the preparation of the document for indexing by typographical and functional segmentation of the document. In a preferred embodiment of the invention, the first step further comprises the syntactic parsing of the free text.

The second step of the method according to the current invention comprises the extraction of concepts from the segmented text and the indexing of the document based on the concepts extracted. In a preferred embodiment, the second step may further comprise the coding of the text using a standard medical coding system, such as ICD-9, ICD-10, MedDRA, SNOMED or other formal coding system. The second step of the method according to the current invention makes use of a formal ontology of concepts that are independent of language.

The Formal Ontology

The formal ontology according to the current invention comprises a plurality of concepts one part of them being independent of a specific language, the other part being those concepts that explain the relationships between language-independent concepts and language as a medium of communication. By independent of language it is meant that the concepts do not depend on a particular language to be given a definition within the system. For example, in English, the word "dog" is a label applied to the concept of a particular animal. In other languages the same concept may be labeled with a different word, such as "Hund" in German, "cane" in Italian, or "perro" in Spanish. In reality, regardless of the label used in a particular language, the concept of the animal remains reasonably constant. The concept is therefore said to be independent of a specific language. Similarly, in the domain ontology according to the current invention, the concept for this particular animal is not dependent on a particular language. By keeping concepts independent of a specific language, the system according to the current invention can link concepts contained in the formal ontology to terms in more than one language.

However, although the concepts are independent of any specific language (such as English, French, . . . ), in the present invention they are not represented as being independent of language as a medium of communication. The second part of the formal ontology, the linguistic ontology, contains concepts about how humans interpret language. For example, the linguistic ontology according to the current invention contains the concept labeled "dispositive doing", which as a real world object relates to instances of an actor doing something to an actee. The concept is independent of a specific language because the notion of actor and actee in the context of the real world object, an action, is common to all languages. However, the concept is not totally independent of language in that the concept governs how the relationship between the actor and actee is understood by human beings. For example, in the sentence "The doctor treated the patient."

it is understood in language that the action "treated" has an actor "doctor" and an actee "patient". That is, in the real world human beings understand that doctors treat patients, and patients don't treat doctors. The linguistic ontology applies this understanding to the real world object "treatment".

Thus, the concepts that are contained in the formal ontology are of two types generally. The first type of concept relates to real world objects that are recognized by human beings as metaphysical instances. These concepts comprise physical entities, procedures, ideas, etc and are contained in the domain ontology. The second type of concept relates to how human beings understand language and allows the identification of real world instances. That is, how human beings understand the interactions of real world objects represented by the concepts in the domain ontology.

The concepts that are contained in the formal ontology will depend on the knowledge area that the ontology is to be applied to, as well as on the principles according to which human languages function independent of the knowledge area. The domain ontology may contain concepts comprising general knowledge about the world, or may be limited to a specific knowledge area of interest to a user. Similarly, the linguistic ontology may define very broad rules about how language functions, or it may define very narrow rules to limit the relationships that can exist between concepts in the domain ontology. In a preferred embodiment of the system according to the current invention, the concepts contained in the domain ontology are limited to the knowledge area of medical concepts complemented by a linguistic ontology containing the concepts required to understand how natural language functions, and how humans deal with natural language. However, ontologies built with concepts from other knowledge areas can be created with equal success.

By allowing the concepts in the formal ontology to remain independent of specific language, the system according to the current invention allows documents in a variety of languages to be indexed and searched independent of the language(s) known by the system user. According to a preferred embodiment of the invention, the concepts in the formal ontology are tagged with labels in English to allow easy maintenance of the formal ontology by a user. However, the labels in English are for ease of use in maintaining the formal ontology only and do not contribute to the functioning of the system in indexing or retrieval of documents. The concepts in the formal ontology can be alternatively labeled in Dutch, German, French, Italian or any other language desired by the user. Alternatively, the concepts may be labeled using a coding system that is completely independent of language, such as ICD-9 or ICD-10.

Figure 2:
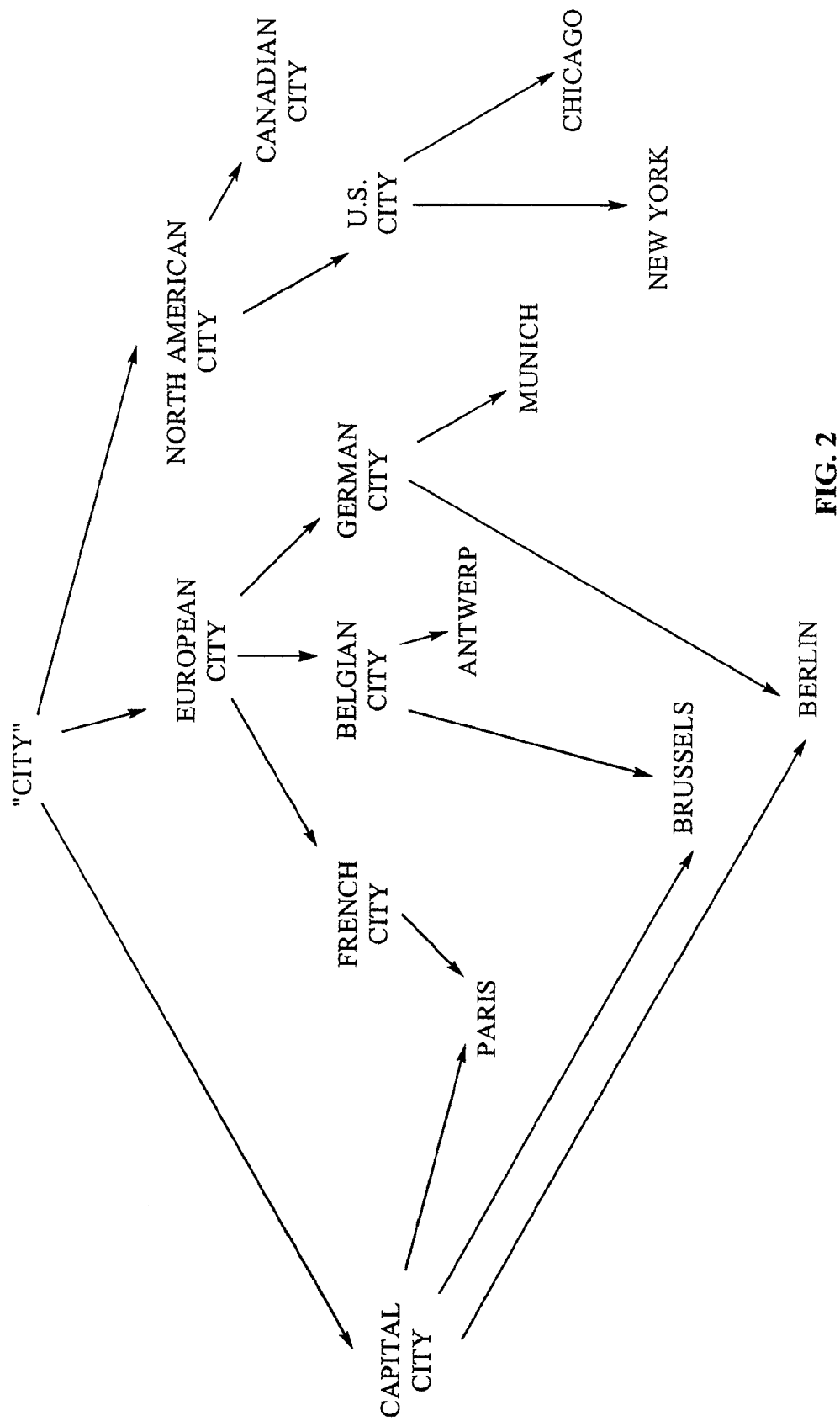
FIG. 2 is an example of the formal ontology hierarchical structure.

The basic architecture of the formal ontology of the current invention is a directed graph, i.e. a hierarchical structure that allows multiple parents. Referring to FIG. 2, an example of the hierarchical structure is shown. In the hierarchy shown in FIG. 2, a primary node comprises a single primary concept. In the example shown, the single primary concept is the concept "City". The primary concept has as direct children, narrower related concepts, such as "European City" and "North American City". Each of the child concepts further have one or more child concepts that further narrow the primary concept. For example, the concept of "European City" may be narrowed to "French City", "German City" and "Belgian City". The concept of "North American City" may be narrowed to "Canadian City" and "US. City".

The hierarchical structure of the formal ontology, creates the most basic relationships between concepts contained in the formal ontology, that of parent and child in a strict formal subsumption interpretation, and that of siblings. The formal subsumption interpretation guarantees that all characteristics described of a parent, apply to all of its children without any exception. Referring again to the example, the concept of "City", which occupies the highest level of the hierarchy is the parent concept to "European City" and "North American City". By reciprocal relationship, the concepts of "European City" and "North American City" are the children of the concept "City". Further, the concept of "European City" is the parent of the concept "German City", etc. Further, the concept of "City" is the grandparent concept to the concept "German City", etc. Still further, the concepts of "European City" and "North American City" have the relationship of siblings since they share a common parent.

Regardless of the knowledge area of the concepts contained in the formal ontology according to the current invention, a similar hierarchical structure with parent/child and sibling relationships exists. This is true of both the general world concepts in the domain ontology and the linguistic concepts in the linguistic ontology. In a preferred embodiment of the invention, the highest level of the hierarchy is occupied by a primary concept with a label such as "Domain Entity". According to the preferred embodiment of the invention, the primary concept of "Domain Entity" encompasses all real things whether they be physical entities, states, ideas, etc. The primary concept may then preferably be sub-divided into physical entities, states, ideas, linguistic concepts, etc. at the next lower level of the ontology.

It should be apparent that because the hierarchical structure of the formal ontology, that all concepts in the ontology can be traced back to a single related concept at the highest level of the ontology, such as "Domain Entity". On the most basic level therefore, the degree of relatedness between two concepts can be measured by how many steps in the hierarchy must be traversed to find a common ancestor for the two concepts. Again referring to the example, the concepts of "Brussels" and "Antwerp" are siblings since they share a common parent, and are therefore closely related to each other within the hierarchy. By contrast, one must traverse the hierarchy back to the primary concept of "City" to find a common ancestor for the concepts of "Brussels" and "Chicago". Since the concepts of "Brussels" and "Chicago" share only a great-grandparent concept in common, they are less closely related within the context of the hierarchy than are the concepts "Brussels" and "Antwerp".

It should further be recognized that a single concept can have more than one direct parent. For example, in addition to the child concepts shown in FIG. 2, the concept "City" may have a child concept "Capital City". In this case "Paris", "Berlin" and "Brussels" would be children of the concept "Capital City" in addition to being children of "French City", "German City" and "Belgian City" respectively. By allowing a concept to have multiple parent concepts, the degree of relatedness between two concepts within the hierarchy may vary based on the context of the relationship. As can be seen from the examples, "Paris", "Berlin" and "Brussels" are more closely related in the context of "Capital City" than in the context of "European City". The only limitation on the structure of the hierarchy is that a concept cannot have itself as an ancestor, which would lead to a circular reference of a concept to itself.

As stated above, the most basic relationship between concepts in the formal ontology according to the current invention is the link created by the parent/child relationship. However, the relationships that can exist between two concepts in the formal ontology according to the present invention is not limited to that of parent and child. By allowing other relationships to exist, the richness of the knowledge contained in the formal ontology is greatly enhanced, while limiting the overall size of the ontology. For example, in reality the medical concepts of "brain", "inflammation" and "meningitis" are quite closely related. However, the concept "brain" refers to a body part, whereas "inflammation" is a symptom and "meningitis" is a disease. If a formal ontology were limited to parent/child relationships as a measure of the relatedness of concepts it is likely that the degree of relatedness between these three concepts within the ontology would potentially be very low. This is because a large number of parent/child relationships would likely have to be traversed before a common ancestor was found for all three concepts. This would of course lead to an inaccurate reflection of reality. A potential solution to this problem would be to construct a formal ontology with sufficient detail to narrow the gap between these concepts in the hierarchy. For example, the concepts of the body part "brain" and the symptom "inflammation" could be made children of the concept of the disease "meningitis". However, in order to provide an accurate reflection of reality it would be necessary to construct similar relationships between "brain" and "inflammation" and every other concept that they are related to. Since the concepts of "brain" and "inflammation" would most likely be attached to a large number of concepts, this would result in a large number of such parent/child relationships. Further, similar parent child relationships would have to be built for every concept in the ontology. This would result in an unmanageably large ontology. In addition, such a solution would violate the formal subsumption nature of the parent/child relationships exploited in this invention.

The current system solves this problem by providing a large number of link types for linking concepts within the formal ontology. The link types within the formal ontology according to the current invention are used to define relationships between concepts. For example, in reality the concept of "brain" is linked to the concept "meningitis" in that the brain is the location for the disease meningitis. Using the link types available in the formal ontology, a user can create a link between the concepts "brain" and "meningitis" in the formal ontology so that this conceptual link is also recognized by the system. A user may further create a link between the concept "inflammation" and the concept "meningitis" in the formal ontology to indicate that inflammation is a symptom of meningitis. Again, this allows the system to recognize a conceptual link that exists in reality. Furthermore, by linking the concepts "brain" and "inflammation" to the concept "meningitis", a conceptual link between the brain and inflammation is created. That is, the link through the concept "meningitis" shortens the distance between "brain" and "inflammation" within the ontology. By shortening the distance between these two concepts, the conceptual linkage between the two concepts in the ontology is increased.

An advantage of this type of linking of concepts is that it allows for more accurate indexing of documents because the deep meaning of the text can be pulled out. For example, a text that contains a discussion of meningitis may contain very few instances of the exact term "meningitis". However, the document may contain a significant number of references to inflammation in the brain. A standard indexing technique that looks only for the specific concept "meningitis" may rank such a document of very low relevance, while in reality it may have a very high relevance to the subject. In contrast, the system according to the current invention will recognize the linkage between the concepts of "brain", "inflammation", "meningitis" and as a result rank the document with a more accurate relevance to the subject.

The number of link types that can be provided for an ontology is only limited by the number of such relationships that can exist in reality. According to a preferred embodiment of the invention, a user can use the available concepts and link types to build criteria and concept criteria. A criteria according to this embodiment is comprised of a concept with an associated link type. For example, the link type HAS-LOCATION can be associated with the concept BRAIN to produce the criteria [HAS-LOCATION] [BRAIN]. This criteria can further be used to define a property of another concept as part of a concept criteria. For example [MENINGITIS] [HAS-LOCATION BRAIN]. The association of the criteria [HAS_LOCATION] [BRAIN] to the concept MENINGITIS provides a partial definition of the concept meningitis.

In a preferred embodiment of the invention, each link type from a first concept to a second concept has a complimentary reciprocal or contra link type that can be established from the second concept to the first concept. For example in reality, when two objects "A" and "B" are close to each other, we say that "A" is close to "B" and "B" is close to "A". In such case where a relation operates bi-directionally, the ontology is constructed by placing the same link type twice, from "A" to "B" and from "B" to "A". E.g.: A IS-NEAR-OF B, B IS-NEAR-OF A.

A second case of paired link types according to this embodiment is used to describe an inverse relationship. For example, where concept "A" performs some action on "B", "A" is defined as acting on "B" whereas "B" is defined as being acted on by "A". E.g.: A HAS-ACTOR B<-> B IS-ACTOR-OF A; or A IS-SPATIAL-PART-OF B<-> B HAS-SPATIAL-PART A. The link types can be declared each other's inverse by use of either CONTRA or AUTOCONTRA attributes that can be assigned to them.

The operation of link types and reciprocation will now be explained by means of example. Prior to the explanation, it is necessary to define what is meant herein by the term "instance". As used herein, the term "instance" refers to an individual manifestation or embodiment of a concept in the real world (i.e. metaphysical instances). By example, for the concept of the disease meningitis, an individual diagnosed case of meningitis contracted by a specific person would be an occurrence or "instance" of the disease.

Now if we declare in the formal ontology "MENINGITIS" IS-CAUSE-OF "INFLAMMATION IN THE BRAIN", then it means that all metaphysical instances of meningitis cause inflammation in the brain. However, this does not provide any reciprocal information about metaphysical instances of inflammation in the brain.

By contrast, if we declared "INFLAMMATION IN THE BRAIN" HAS-CAUSE "MENINGITIS", then it means that all metaphysical instances of inflammation in the brain are caused by meningitis. Here again however, we are provided with no information about metaphysical instances of meningitis.

By declaring a CONTRA, such as "MENINGITIS" IS-CAUSE-OF CONTRA HAS-CAUSE "INFLAMMATION IN THE BRAIN", the system according to the current invention provides information about all instances of meningitis: all instances of meningitis cause inflammation in the brain. By declaring a CONTRA, the system also provides information about some instances of inflammation in the brain: some instances of inflammation in the brain are caused by meningitis.

By declaring an AUTOCONTRA, such as "MENINGITIS" IS-CAUSE-OF AUTOCONTRA HAS-CAUSE "INFLAMMATION IN THE BRAIN", the system according to the current invention provides information about all instances of meningitis and all instances of inflammation in the brain: all instances of meningitis cause inflammation in the brain AND all instances of inflammation in the brain are caused by meningitis.

By using the various link types, and CONTRA and AUTOCONTRA declarations to link concepts within the ontology, a user can build definitions of the concepts in the ontology, while giving it a precise semantics as to how these declarations are to be applied by interpreting events in the world, this however without the computational burdens related to full first order logic.

As stated above, creating a link between two concepts defines a relationship between the two concepts. It also defines something about at least one of the concepts itself, such as "brain" is the location of "meningitis", or "inflammation" is a symptom of "meningitis". By creating these two links, a user enriches the knowledge contained on the ontology by providing a definition for the concept "meningitis" based on its interactions with other concepts in the ontology. In a preferred embodiment of the invention, a full definition can be created for each concept in the formal ontology. The full definition as it is used here means the set of necessary and sufficient links that a concept has to identify occurrences in the real world as instances of the concept. In other words: the set of all links of a given concept in the ontology defines what is true for all occurrences in the real world that are instances of the concept. The full definitions assigned to a concept in the ontology allow occurrences in the real world to be recognized as instances of the particular concept.

A further feature of the formal ontology provided according to the invention is the subsumption of child concepts within parent concepts, which results in full inheritability of links from parent to child concepts. That is, a child concept will automatically be linked to all concepts that its parent is linked to. For example, the concept "meningitis" may have the child concepts of "viral meningitis" and "bacterial meningitis", both of which are more specific concepts subsumed within the concept "meningitis". Thus the link established between the concept of "meningitis" and "brain" will automatically be established between the concept of "viral meningitis" and "brain", and "bacterial meningitis" and "brain". Therefore, "viral meningitis" and "bacterial meningitis" will inherit the definition of the parent concept "meningitis", but will be further defined based on the further links that each has to other concepts. In this way, the system according to the current invention can recognize each instance of either "viral meningitis" or "bacterial meningitis" as an instance of "meningitis", but will not necessarily recognize each instance of "meningitis" as "viral meningitis" or "bacterial meningitis". This feature provides the advantage of allowing a user to propagate a link to the progeny of a concept by establishing a single link.

As stated above, the link types provided as part of the formal ontology can be used by a user to define relationships between two concepts. At the same time the link types can provide full definitions of the concepts in the formal ontology. However, it is recognized in reality that, some relationships between concepts do not make sense. For example, it is recognized in reality that the disease "meningitis" cannot not have "inflammation" as a location. In computerized systems however, such nonsensical relationships are not automatically recognized unless you make the system work under a "close world assumption" (i.e. what is not known, is not allowed), or if it is specified explicitly what is not allowed. It is necessary to teach a natural language understanding system what are and are not appropriate relationships between concepts.

The system according to the current invention solves this problem by providing the linguistic ontology as part of the formal ontology. The linguistic ontology contains the rules about how language works as well as the principles that the human mind adheres to when representing reality at the conscious level of a human being.

In the linguistic ontology provided according to the current invention, rules are established regarding what relationships can exist between concepts on the basis of how these relations are expressed in language in general (though independent of a specific language). For example, a rule may be established that the concept "disease" in the formal ontology cannot be linked to the concept "symptom" in the formal ontology as a location. Because "meningitis" and "inflammation" are children of "disease" and "symptom" respectively in the hierarchy, the rule prohibiting this link would be inherited by them.

As a result, the definition of inflammation as a location for meningitis could not exist in the formal ontology.

In one embodiment, the linguistic ontology may be set up so that there is an absolute prohibition against using certain link types to link certain concepts. In the example above, a user would not be able to create a link indicating the concept "inflammation" as a location for the concept "meningitis". Alternatively, the linguistic ontology could be set up such that a verification by the user will be required when a prohibited link is proposed. In this embodiment, the user still has the option to create the link.

The rules established in the linguistic ontology may be as broad or restricting as required for a given application or knowledge area.

A second application of the linguistic ontology is that it restricts the possible representations of reality to those that are closest to the way reality is talked about by means of language. For example, in a shooting event, there are a number of participants such as the shooter, the deer, the bullet, the gun, etc. There is only that one specific event that happened (the shooting) in a precise way (the deer hit by the bullet shot from the gun by the shooter), but there are different ways to represent it formally: it can be represented from the viewpoint of the deer, the bullet, the shooter, etc. The present invention exploits the way humans usually talk about such an event, giving a central place to those aspects that are put central by the story teller.

A third application follows from the second in that sometimes single events are described as distinguishable entities by means of natural language. An example is the notion of baby brought on earth, wherein the view of "birth" (the baby's viewpoint) is equally preferred in medical language usage as that of "parturition" (the mother's point of view) or "delivery" (the physician's point of view).

The domain and linguistic ontologies have thus far been spoken of as being separate entities within the formal ontology. However, in the current invention they are connected within the formal ontology in that a concept may have both a domain and a linguistic concept as a direct parent. For example, the linguistic concept of "dispositive doing" may have as a child the concept of a "treatment", wherein a "treatment" as an action has a physician as actor and a patient or disease as actee. At the same time, "treatment" may descend from the parent concept "healthcare procedure" in the domain ontology. Within the domain ontology, the concept of a "treatment" is defined as a real world object, but this definition cannot be used to relate the object to other real world objects. The linguistic ontology defines how the real world object actively relates to other concepts and relates other concepts in language.

As indicated above, the formal ontology according to the current system is independent of any specific language, although not independent of language altogether. However, free text documents are written in specific languages. In order to be useful for indexing free text documents it is necessary to relate the language independent concepts to specific languages.

The system according to the current invention accomplishes this by providing a lexicon of terms that are linked to the formal ontology. The terms contained in the lexicon may comprise single words or multi-word units that correspond to concepts, criteria and concept criteria in the formal ontology. Further, each term in the lexicon may be linked to more than one concept, criteria or concept criteria in the formal ontology, which allows for the existence of homonyms. Likewise, each concept, criteria and concept criteria may be linked to more than one term in the lexicon, such as when terms in two or more languages are contained in the lexicon.

When indexing a free text document or interpreting a query to retrieve an indexed document, the system according to the current invention uses the lexicon of terms to segment the free text and to relate the free text to the concepts, criteria and concept criteria contained in the formal ontology. Thus, the current system makes use of both terms and independent concepts in the analysis of free text.

Managing the System, System Architecture

An additional feature of the present invention provides a management system for managing the formal ontology. As discussed, the formal ontology according to the current invention can be constructed using any available relational database system, such as ORACLE®, SYBASE® and SQLSERVER®. The ontology itself is abstracted away from the relational database system by wrapping access to the database into a management tool that exposes functionality to the user. The database functions as a physical storage medium for the ontology. According to the current invention a management tool is provided for giving a user access to the ontology for the purpose of adding to or manipulating the ontology. The tool allows the user to view the formal ontology using a variety of different criteria that together give a complete picture of the structure of the formal ontology. In a preferred embodiment of the invention a user can view several different views of the ontology at once as a layout, allowing the ontology to be viewed from several perspectives at once.

Figure 3:
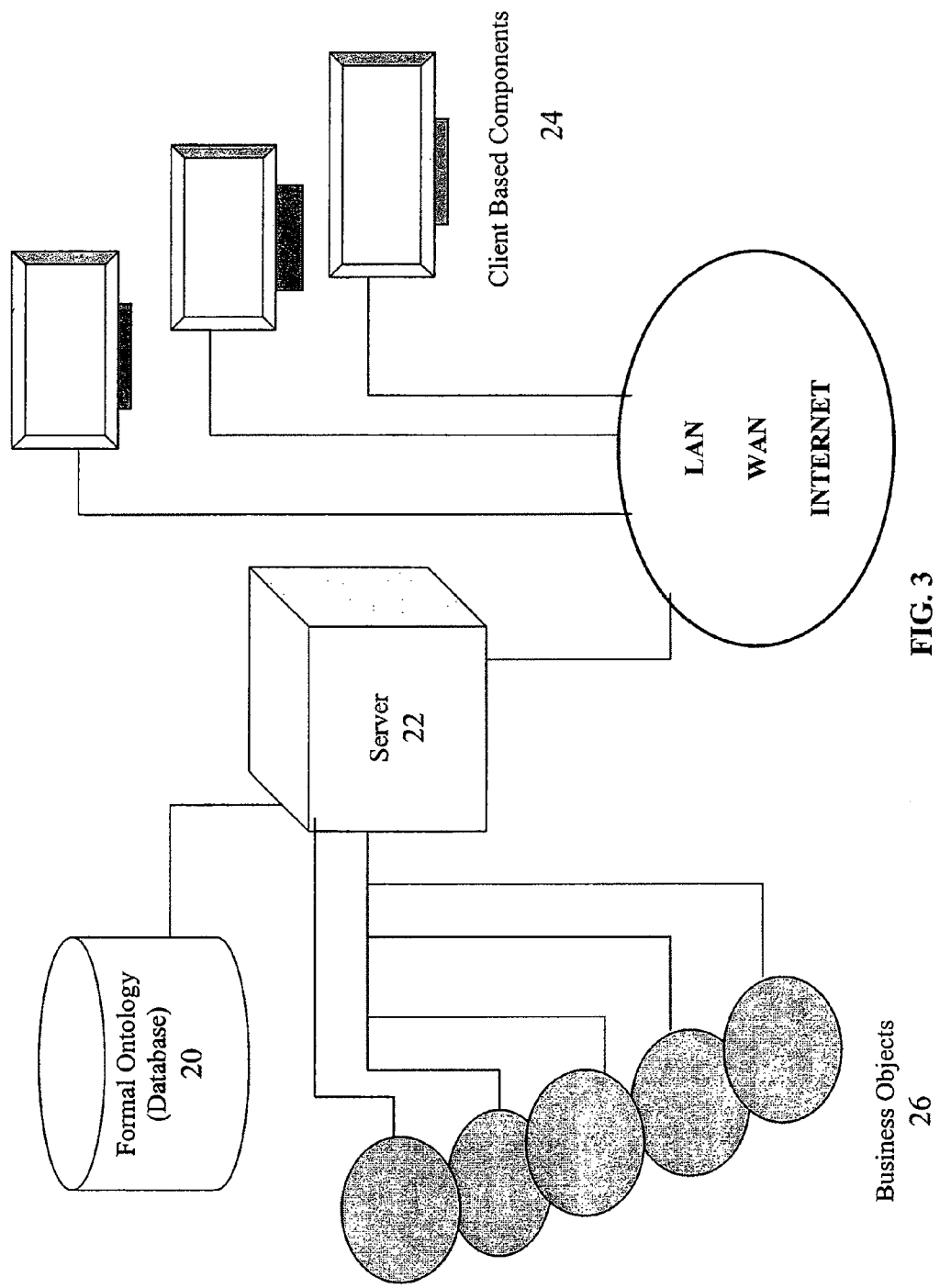
FIG. 3 depicts the architecture of the ontology management system.

The management system for maintaining the formal ontology will be explained with reference to FIG. 3, which shows the architecture of the ontology management system according to the current invention. The formal ontology and lexicon of terms are stored on a database 20, which is in communication with a server 22, which houses the server based component of the ontology management tool 26. The server based component of the ontology management system comprises a relational database which controls access to the formal ontology, and contains the components for building the formal ontology, such as the hierarchical structure, link types, setting rules in the linguistic ontology, linking terms to concepts, etc, along with the tools for creating multiple views of the ontology. The ontology management system further comprises a client based component(s) 24 that allows a user to access and maintain the ontology via the server based component 22. The system can be implemented on a number of platforms, including but not limited to WINDOWS®, SOLARIS®, UNIX® and LINUX®. Preferably, the management tool 26 is a set of business objects. A low layer is a thin wrapper on top of the database structure that implements the base functions to access a particular relational database. A middle layer also exposes a set of functions that manage multi-user access to any type of supported database, such as a relational database. As such the middle layer allows the creation of customized versions of the management tool within certain limited parameters. A top layer implements the high level interface. This interface surfaces functionality from a logical point of view to outside users (e.g. "getConceptTree" is a high level layer function that makes use of the underlying middle and low level layer functions to populate a tree object with information about the place of a concept in the formal ontology). Functionality implemented by the low and middle layers includes but is not limited to the linking of external databases, database manipulation and navigation, and text searching.

Linking External Databases

As described thus far, the formal ontology according to the current invention is constructed manually by a user by creating hierarchical levels, slots within those hierarchical levels and further filling those slots with concepts, thereby creating the basic hierarchy with its parent/child relationships between concepts. The user further enriches the knowledge base by using the link types provided to define relationships between the concepts entered into the hierarchy. In addition to being able to manually construct the formal ontology, an alternative embodiment of the system according to the current invention provides the ability to map data from an independent database onto the formal ontology.

In a number of knowledge areas, large databases of information are already in existence. In order to avoid the laborious work of manually re-entering this information into the formal ontology, the system according to the current invention provides the capability to link the formal ontology to an external independent database. Although the external data never becomes a physical part of the ontology, this feature allows a user to access and use data contained on an independent database as if it were part of the formal ontology.

Data in an external database is linked to the ontology by creating a parent/child relationship between at least one concept in the formal ontology and at least one item of data in the database. In the case of an external database in tabular format, such as an ACCESS® database, a user can link an entire column of data in the external database to one or more concepts in the formal ontology by creating a parent/child link between at least one concept in the ontology to the header for the column in the table. Normally, when data is provided in tabular format, each column of the table is given a header with a descriptive title for the data contained in that column. In creating the parent/child relationship between the concept in the ontology and the column of data, the system analyzes the title and associates it with appropriate concepts in the ontology. Alternatively, the system may provide the user with a list of potential concepts that the data can be mapped to. The system may make use of the terms contained in the lexicon when performing this function. In an alternative embodiment of the invention, a user can manually map an item or column of data to the desired concept.

Figure 4:
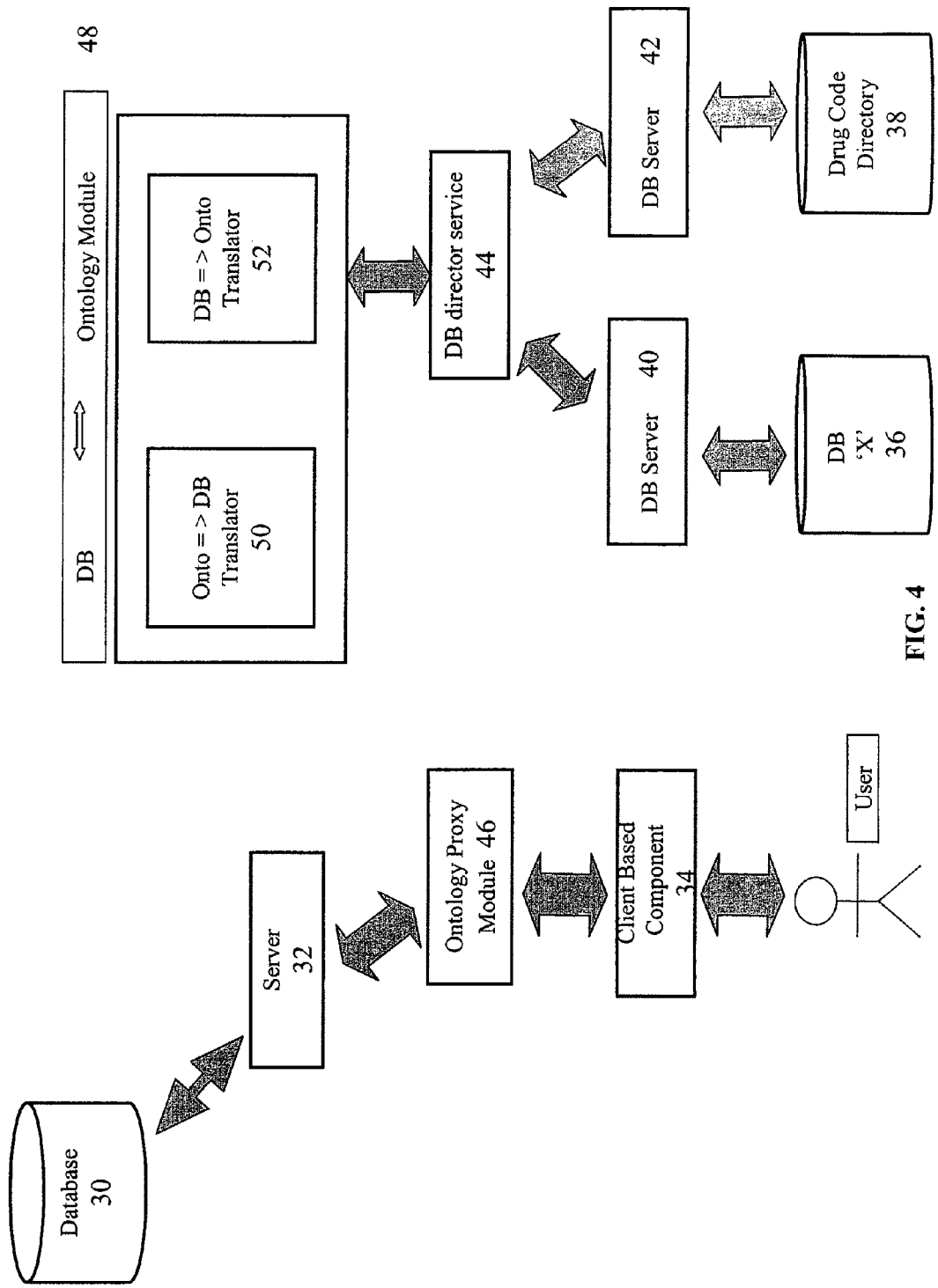
FIG. 4 illustrates an example of mapping an external database to the formal ontology.

Referring to FIG. 4, an example of how an external independent database may be mapped to the formal ontology is shown. The relational database 30, server 32 and client based component 34 are as described in FIG. 3. Databases 36 and 38 are external independent databases, such as ACCESS® databases containing data to be mapped onto the formal ontology. Database servers 40 and 42 associated with each database 36 and 38 allow access to their respective databases so that queries can be run. A database directory service 44, assigns keywords to the separate databases 36 and 38. According to the current system, the same keyword may be assigned to two or more databases containing similar data that can be accessed at the same time. The database directory service provides the location of all of the available databases to an ontology proxy module 46. The ontology proxy module 46 receives queries from a user via the client based component 34. The ontology proxy module then directs the queries to the server 32 and to a database-ontology mediator module 48. The database-ontology mediator module comprises an ontology-to-database translator 50 and a database-to-ontology translator 52. The ontology-to-database translator 50 serves the function of translating the ontology concept based queries to database queries that can be used to search the databases 36 and 38 for data that is mapped to the particular concept or concepts embodied in the query. The database-to-ontology translator 52 serves the function of translating the information returned from the database to a form that can be viewed by the user via the client based component 34.

Coding Using Independent Coding Systems

In a preferred embodiment of the system according to the current invention, the formal ontology is comprised of a knowledge base of medical concepts. A preferred use for the system is in the indexing of medical documents. A further preferred application of the system according to the current invention is the coding of medical documents using a standard medical coding system. Standard medical coding systems that can be used in conjunction with the current invention include, but are not limited to ICD-9, ICD-10, MedDRA and SNOMED.

To accomplish this, the medical concepts contained in the formal ontology of the system can be mapped to the appropriate codes contained in the appropriate independent database (i.e. ICD-9, etc). Alternatively, the appropriate coding system may be included in the formal ontology as a separate and parallel hierarchy to the hierarchy of medical concepts. In this alternative embodiment, each medical concept is linked to the appropriate code via a "has code" link type. For example, the concept "meningitis" would be linked to the ICD-9 code 322.9 or the MedDRA code 10027252.

By linking the concepts in the ontology to the appropriate codes, the system is able to annotate free text documents with these codes as the documents are being indexed.

Indexing Free Text Documents

Figure 5:
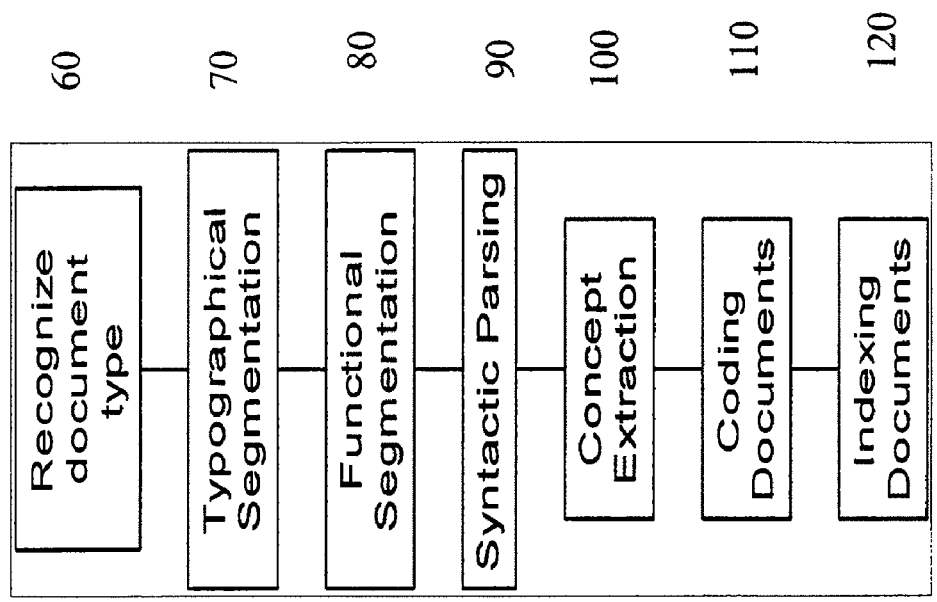
FIG. 5 illustrates an example of the method of indexing free text documents.

The system will now be described in terms of the steps performed by the primary system sections that segment and parse free text documents, and extract concepts from text documents. The method of indexing free documents using the system comprises identifying the type of the text document and reducing the text to segments. Referring now to FIG. 5, input text from free text electronic documents is linguistically processed prior to concept extraction. A document or other text in computer-readable format, such as rtf, html, or plain text, is recognized 60. The text is then broken down into components, such as sections, paragraphs, sentences, words, etc. using typographical 70 and functional 80 segmentation, and preferably syntactic parsing 90, which prepares the text for concept extraction 100, coding 110 and indexing 120.

Typographical Segmentation

Figure 6:
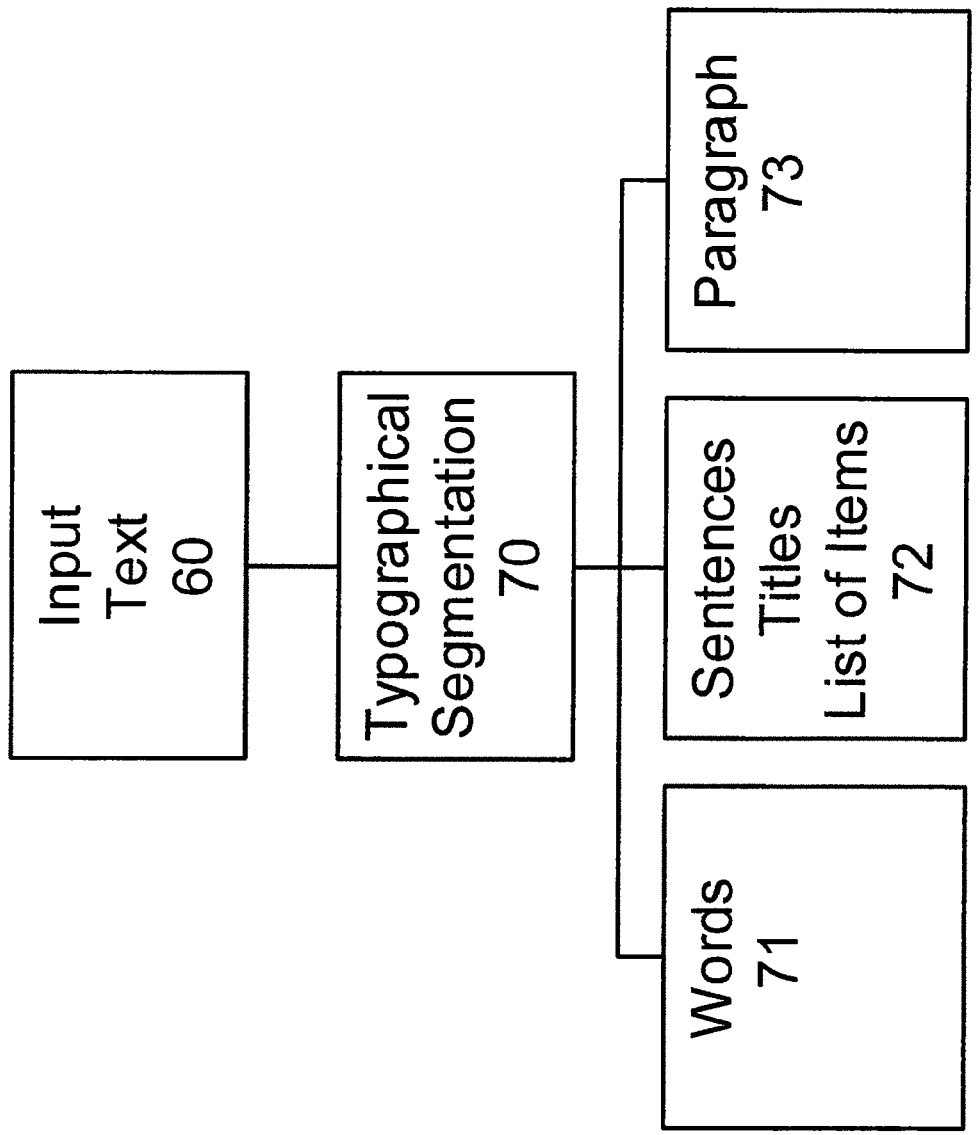
FIG. 6 illustrates an example of typographical segmentation of free text documents.

By way of illustration, input text 60 in FIG. 6 is typographically divided 70 into segments or units such as words 71, sentences, titles and list items 72, paragraphs 73 or any other unit consisting of one or more words on the basis of character patterns.

At the lowest level, a word is a sequence of alphanumeric characters (including characters such as hyphens), delimited by spaces, tabs, newlines (paragraph markers or shifts to signal new lines of text) and punctuation marks. At this level, words are typographically segmented 71 based on delimiting characters. For example, "New York" is two words: "New" and "York", as they are delimited by a space character. In the case of abbreviations and universal resource locators (URLS), a period is not a delimiter, for example, "e.g." is recognized as a single segment if it is contained in the lexicon of terms. Internet addresses are recognized as a single segment and words within an address are not segmented, for example, www.usvto.aov is a single segment.

The typographical segmenter uses certain punctuation marks including but not limited to periods, exclamation points, questions marks, etc. as the termination of a series of words that are considered a sentence unit, with the exception of those cases where the period is taken as part of a segment. According to another aspect of this invention, sentences will be segmented 72 without a sentence punctuation marker where a series of words is followed by a paragraph marker. For example, title lines embedded within documents often lack punctuation marks but are followed by a paragraph marker and thus should be segmented from the text that follows them.

In some cases, typographical clues such as capitalization of a series of paragraph-initial words indicate that the series of words should be taken as a section title rather than as a normal sentence. In other cases, the word series is taken as an item in a bulleted or enumerated list 72, such that the bullet marker or number preceding the text signals the word series as a list item.

Paragraph segments 73 are generated where a series of words is terminated by a paragraph marker. For plain text, a paragraph marker is in some cases a single newline character, and in other cases, a single newline is used for line breaking only, and a double newline character indicates paragraph boundaries. In HTML and XML, special tags are used to indicate paragraph boundaries, e.g., <p> . . . </p>.

Figure 7:
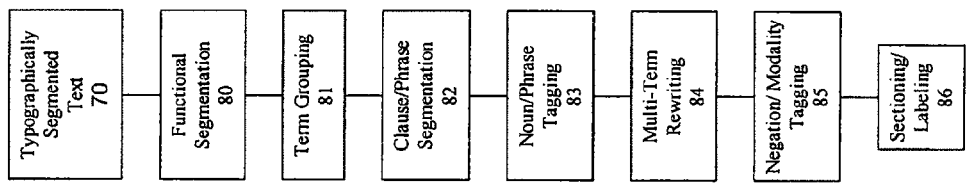
FIG. 7 depicts an embodiment of functional segmentation of free text documents.

The result of typographical processing can be seen in terms of an XML document, an example of which follows. Note however that XML output is only one means of representing the segmented document and that other means for representing the segmented text fall within the scope of this invention.

rather than how they appear as text. As illustrated in FIG. 7, functional segmentation 80 uses words, sentences, titles, list items, paragraphs and any other unit of words generated by the typographical segmenter, and functionally segments the typographical segments.

Terms may be grouped together into multi-word terms by term grouping 81. Term grouping 81 involves a decision to treat several adjacent words as a single term, based on whether the sequence of words corresponds to a multi-word item in the lexicon. For example, "New York is . . . "→"/New York/ is . . . " Term grouping 81 facilitates mapping from terms to concepts. "New" and "York" by themselves are not associated with the desired concept, the city, while the term "New York" is.

Clauses and phrases are generated 82 from sentences, which units may be too large to be useful in text indexing and concept extraction. According to one embodiment of this invention, a clause is a structure of words based around a verb. For instance, "He was diagnosed with cancer" is a clause, with "diagnosed" as the main verb. In "He had cancer but it was not operable" we have a sentence which divides into two clauses, linked by "but". A phrase is typically smaller than a

---

Input for Typographical Segmentation:

---

REASON FOR CONSULTATION: I was asked to reevaluate this pleasant woman known to our service having previously undergone dialysis access.
At this time, she has a clotted left forearm Gore-Tex graft with nonfunctional right subclavian Gambro. She is right dominant and because of body habitus is not an ideal candidate for a femoral Gore-tex.
We will plan Perma-Cath in the morning.
Thank you for allowing us to participate in her care.

---

Output for Typographical Segmentation:

---

```
<document>
    <paragraph>
        <title><w>REASON</w> <w>FOR</w> <w>CONSULTATION</w>
<punct>:</punct></title>
        <sentence><w>I</w>   <w>was</w>   <w>asked</w>   <w>to</w>
<w>reevaluate</w>
<w>this</w> <w>pleasant</w> <w>woman</w> <w>known</w> <w>to</w>
<w>our</w>
<w>service</w> <w>having</w> <w>previously</w> <w>undergone</w> <w>dialysis
access</w> <punct>.</punct></sentence>
    </paragraph>
...
    </document>
```

---

Functional Segmentation

Referring to FIG. 7, typographically segmented free text 70 is segmented into functional segments 80. For example, single or multiple words may be joined into a single segment that is known in the lexicon of terms, such as joining "New" and "York" as "New York" where "New York" is part of the lexicon. In addition, multiple words may be joined to create phrases and paragraphs may be joined to create sections.

Functional segmentation 80 divides the text into elements which are typically not typographically indicated, but would still be recognized as a unit by a human. Typically, to recognize these elements requires linguistic knowledge. For example, to know that "New" and "York" form a single term together requires access to a lexicon. To recognize that the first three words of "His left lung has deteriorated" refer to an object requires syntactic and semantic knowledge, and a division of text into units on the basis of how text units are used clause, and can be of various types, e.g., a prepositional phrase such as "in the morning."

Sentences or larger text units are divided into clauses and phrases 82 by splitting the sentence on each occurring split token, rejoining segments where conditions indicate that a split was not appropriate, and tagging the segments as clause-phrase. The words which are used to indicate a new clause/phrase (the "split tokens") include, but are not limited to: and, but, or, ",", ";", although, however, therefore, because, since, during, until, which, if, except, who, while, when, where; with, without, "to avoid," and "to the point."

Conditions may exist for which split tokens should not and do not define a new clause/phrase segment. If a split is made by "and" or "or", and the first phrase ends with a noun-phrase, and the second clause continues with a noun-phrase, then a new segment should not be defined at the split token "and" or "or." For example, the sentence "He has a broken leg and torn ligament" will not be segmented into two units by the token "and." If split by a comma, the comma is preceded by a nominal token, and the second clause starts with a nominal, the sentence will not be segmented into units. For example, "He likes fish chips and sausages" should not be divided into segments at the comma. If split by a comma, and the segment preceding the comma is an adverb, the sentence will not be segmented into units. For example, "Possibly, he was sick" will not be segmented at the comma.

The functional segmentation procedure internally represents each sentence as a series of clause/phrase segments. These can be used in further processing, or included in a saved XML file showing segmentation. Graphically, clause/phrase segmenting is illustrated as follows where "//" indicates a clause/phrase break:

He has this kind of focal pain up near the lateral aspect of the elbow,//however, not over the lateral epicondyle.//He had an MRI since his last visit//which did not show any evidence of epicondylitis//or any other pathology in . . . .

Noun-Phrase Tagging

Many of the concepts contained in text are references to objects or processes. Many of these concept references are expressed in a syntactic structure called a noun phrase (NP), that is, a sequence of words with a noun as head. Similarly, an alternative form of a noun phrase has a gerund verb as head of the phrase. The three examples that follow are noun phrases, with the third noun phrase being an NP with a gerund verb head:

"left lung"
"deterioration of the left lung"
"HIV Testing"

As indicated on FIG. 7, noun-phrases are tagged 83 and parsed from text that has been typographically 70 and functionally 80 segmented into small units, such as clauses/phrases. A syntactic chart parser is applied to each phrase, using a simplified grammar that only recognizes NPs. After parsing, the parse chart indicates which sequences of words in the clause/phrase segments are legal NPs (according to the syntax and lexicon). Where alternative results on the noun-phrase are provided, the parser uses statistics to rank the parses such that the most likely NP is selected. The sequences of words identified as NPs are tagged 83 as such. The output of this process, displayed graphically is shown below, however one of ordinary skill in the art would recognize that the present invention is not limited by a particular way to identify NPs:

He has this kind of focal pain up near the lateral aspect of the elbow, however, not over the lateral epicondvle. He had an MRI since his last visit . . . .

Multi-Term Rewriting

In some cases the text of a document will contain words not stored in the lexicon. In this case a multi-term rewriting 84 procedure is used to rewrite the missing term to something that exists in the lexicon and that represents the same concept or concepts. Multi-term rewriting 84 attempts various rephrasings of sequences of terms in the input text to test for possible re-writes where a multi-term is similar but not the same as a term or terms recognized in the lexicon. For instance, "Cancer of the lung" may not be recognized in the lexicon, although the term "lung cancer" is. The multi-term rewriter 84 recognizes the two terms and suggests that "Cancer of the lung" may be the same as the existing term/lung cancer/in the lexicon. The multi-term rewriter 84 therefore provides a mechanism for enabling concept extraction for terms or multi-word terms that do not exist in the lexicon.

An abbreviation mapping routine recognizes the introduction of abbreviations that are present in the text but not in the lexicon of terms, for example, "Lung Field Examination (LFE)." Later uses of the abbreviation are mapped onto the concept associated with the full form of the unabbreviated text from the definition of that abbreviation that was mapped into the lexicon.

Identification of NPs 83 facilitates multi-term rewriting 84. For instance, in "There appears to be swelling of the artery", the rewrite may be performed on "appears to be swelling" with no result in the lexicon of terms, but a rewrite of the noun-phrase "swelling of the artery" may produce a viable rewrite, e.g. "arterial swelling."

Since the large majority of the rewrite rules concern changing one NP form into another, applying rewrite rules in many situations where they will be unsuccessful can be avoided by first identifying the NPs in the text, and then applying the rewrite rules only to those term-sequences.

Other rewrite rules that do not apply to NPs, such as rewriting verbs, e.g., runs→ran, are kept separate, and are applied to words between NPs.

Negation and Modality Tagging

According to one aspect of the present invention, negation and modality text is tagged 85, as indicated in FIG. 7, to improve the downstream accuracy of concept extraction 100, and coding 110 and indexing 120 of text.

Negation can be readily identified by certain key words, including but not limited to: no, not, without, lacking, zero, non, nor, avoid, absence, denies, deny, denied, never, won't, shouldn't, wouldn't, couldn't, can't, "with no," and "rule out." Examples of negation text are the underlined text as follows:

He has this kind of focal pain up near the lateral aspect of the elbow, however. not over the lateral epicondyle. He had an MRI since his last visit which did not show any evidence of epicondylitis.

In this case, the concepts represented by the negation text such as "however, not over the lateral epicondyle" and "which did not show any evidence of epicondylitis" are not relevant for downstream user applications such as coding. The coding process would identify the mention of the concepts LATERAL_EPICONDYLE and EPICONDYLITIS, and add these to the list of concepts recognized in the text. When assigning codes to a document, for charging purposes for instance, this will produce problems, as the hospital might charge for a disease which was not actually present. A coding process thus needs to be aware that text that is in some way negated should not in general be used for coding.

A similar problem occurs with modalised text—text which, while not negated, is still expressed in such a way as to indicate it has not necessarily occurred. Similarly, modality can be readily identified by certain key words, including but not limited to: maybe, possibly, denies, wants, says, might, may, would, could, should, probably, can, presumed, prefers, prefer, preferred, preferably, wanted, want, wanting, desires, desired, desire, desiring, likely, unlikely, encourage, encouraged, if, questionable, suggestive, etc.

Examples of modality text are:

"The patient denies any history of drug or alcohol abuse."
"This renal cyst might represent an abscess."
"She had possible pneumonia on chest x-ray."
"She wants to add MetroGel to her prescription."

According to one aspect of the present invention, a negation/modality tagging 85 routine tags those parts of a text that are negated or modalised, in order to enable a coding process or code extraction routines to deal appropriately with both negation and modality text.

Often, negation or modality does not apply to the entire sentence that the keyword appears in. For instance:

"His wound was clean without any signs of infection."

It is only the underlined part of the sentence to which the negation applies. The routine of the present invention identifies that part of each sentence that negation applies to by searching each segment for one of the tokens which indicates negation, and negating those tags.

There are cases, however, where such tokens need to be taken in context. For instance, "the knee is not just broken, it is shattered" the use of "not just" does not imply that the state is negated, but rather that the state is present with some extra condition. In accordance with the present method, a routine recognizes that a negation token is followed or preceded by certain tokens, e.g., "not" followed by "just" or "only." Where such contexts are recognized, the negation tag is not applied.

Section Identification and Labeling

Documents and texts are often divided into sections, which aids in comprehension. Knowledge of the functional structure of a document or text helps in storage within computer based systems as well as location of specific information within a database or other computer based storage system. While section titles are often provided by the author, the titles are often missing, or apply to several sections or paragraphs of text. If present, the wording used for a particular section title can vary from document to document.

According to one aspect of the present invention, functional sections of text are recognized and labeled 86, as illustrated in FIG. 7, based on lexis or word-association probabilities, title-based probabilities, and sequence probabilities. This aspect of the invention consists of two parts: recognizing which paragraphs belong together as sections, and determining the best label to apply to each section.

Documents are considered ordered lists of paragraphs $P_1 \ldots P_n$. The level of association between each paragraph $P_i$ and section labels is derived using a machine learning technique to build up an index of lexis probabilities or degrees of association between given words and the sections in which they typically appear. A training model is established whereby section names on a designated training set of documents are hand-labeled, and a statistical process which counts how often particular words appear in particular sections as opposed to different sections is run, giving the level of association between the words and the sections.

Presented with a new document, the level of association between each paragraph and each section label is calculated. The calculation involves extracting words in a paragraph, deleting any repetitions of words, and multiplying together the levels of associations between each word and the section label being considered. The result is a degree of association between the paragraph and the section label, such that a higher figure indicates a strong association and lower figure indicates a weak association.

given paragraph-section label association can be converted to a figure representing the probability of the label being appropriate for the paragraph by dividing the association level by the sum of all association levels for the paragraph. The probability value will fall preferably between 0.0 and 1.0.

The probability values for a paragraph will all sum to 1.0 (or 100%). For example, a particular paragraph of text produced the following probability of applicability in relation to section labels:

| Probability of words in a paragraph (Section Label) | Percentage |
|---|---|
| P(Follow_up) | 95.69% |
| P(Admission _data) | 4.11% |
| P(Therapy_proposal) | 0.14% |
| Other | 0.06% |

Preferably, a sufficient number of examples of a text structure is provided to a computer to establish accurate word associations with sections such that the computer is trained to identify the text structure in other texts.

According to another embodiment of the present invention, paragraph or other text unit titles are used and taken as strong evidence of that paragraph or text unit's section label. Text or paragraph titles are compared to the training model to see how often in the training set the particular title was used within a particular section. If it was always used for a particular section, then that section's label is assigned absolutely. If it was used in more than one section, then the paragraph is assigned one possible label for each of those sections which use the title, and the labels are given a probability proportional to its level of use in the training set, $L_i$. These title-based probabilities are then multiplied together with the lexis or word-association probabilities.

For example, assuming the paragraph with the following lexis probabilities was preceded by a title which associates 70% with Admission_data and 30% with Follow_up:

| Probability of words in a paragraph (Section Label) | Percentage |
|---|---|
| P(Follow_up) | 95.69% |
| P(Admission _data) | 4.11% |
| P(Therapy_proposal) | 0.14% |
| Other | 0.06% |

$$P\_from\_lexis(P_i) * P\_from\_title(L_i)$$
$$\rightarrow P\_from\_lexis\&title(P_i, L_i)$$

$$P\_from\_lexis(FollowUp) * P\_from\_title(Followup)$$
$$\rightarrow P\_from\_lexis\&title(FollowUp)$$
$$0.9569 * 0.3 \rightarrow 0.28707$$

The resulting lexis and title probabilities are then normalized to get the probability of each section label applying to the paragraph using title and lexis information.

Figure 8:
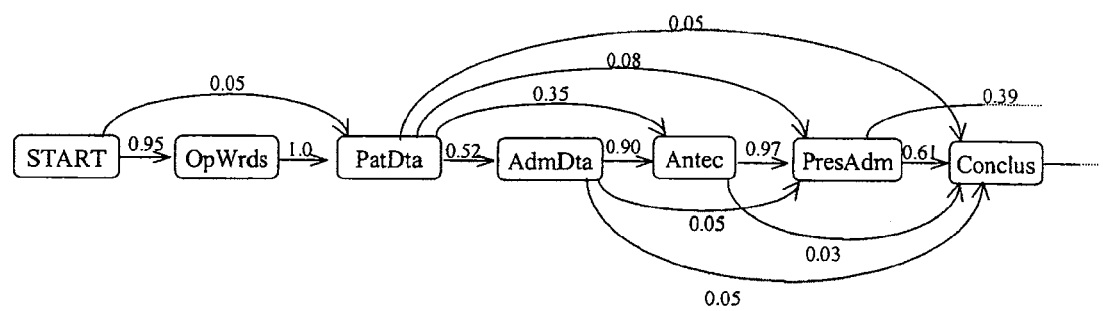
FIG. 8 depicts an example of sequential probability of document sections and labels.

The probability of a section sequence is calculated using a training model. A training model is established whereby a set of documents with hand-labeled section names are selected and a statistical process records which sections follow each section. For instance, the section ADMISSION_DATA may be followed by ANTECEDENTS in 90% of cases, PRESENT_ADMISSION in 5% and CONCLUSION in 5%. These probabilities are normalized to values which sum to 1.0. A value of 1.0 thus signifies that a particular section label always appears in a particular sequence respective to another section label. FIG. 8 illustrates a representation of section sequence probabilities.

According to another embodiment of the present invention, a document is sectioned 86 using combined lexical, title and section sequence probabilities. For each paragraph $P_i$, lexis and title probabilities are calculated as discussed above, $P\_from\_lexis\&title(P_i, L_i)$. The lexis and title probabilities are combined with sequence probabilities.

For example, referring to FIG. 8, assuming an unlabelled document and that no titles are included in the text, sectioning probability and labeling is established using the lexis and sequence probabilities. FIG. 8 illustrates that for a particular type of document, the following sections are common, not necessarily in this order: Opening Words, Patient Data, Admission Data, Antecedents, Present Admission, and Conclusion. For the first section of a document, if the sequence probability analysis indicates that there is a 95% chance of starting a document with Opening-words, and a 5% chance of starting with Patient_data, and the lexis probability analysis indicates the following predictions for the first section of a document:

| | |
|---|---|
| Opening_words | 0.34 |
| Patient_data | 0.55 |
| Conclusion | 0.11 | then the functional sectioning assessment of the document structure up to this point (the first section of the document) is:

| | |
|---|---|
| START ^Opening_words: | 0.95 * 0.34 = 0.32 |
| START ^Patient_data: | 0.05 * 0.55 = 0.0275 |
| START ^Conclusion: | 0.00 * 0.11 = 0.00 |

As these probabilities do not add up to 1.0 (100%), the data is normalized and candidate sections with zero probabilities are dropped, which produces:

| | |
|---|---|
| START ^Opening_words: | 0.95 * 0.34 = 0.921 |
| START ^Patient_data: | 0.05 * 0.55 = 0.079 |

An iterative process is performed for each text section within the document being functionally sectioned whereby lexical and title (if available) probabilities are established for a next section of text, assessing its sectioning and labeling based on words in the text section, and multiplying out again. For example, the probability of theb START^Opening_words path being continued with the section Patient_data is:
1) the probability of the path so far;
2) multiplied by the probability of the sequence Opening-_words^Patient_data;
3) multiplied by the probability of this section being Patient_data based on words alone.

At the end of a text, the path with the biggest probability is chosen. For example, if the second paragraph of the text has associated label probabilities of

| | |
|---|---|
| Patient_data | 0.95 |
| Conclusion | 0.05 | then the two paths established from the first paragraph will result in 4 predictions as follows:

START^Opening-words^Patient_data:
   0.921*1.0*0.95=0.875

START^Opening-words^Conclusion:
   0.921*0.0*0.05=0.0

START^Patient-data^Patient_data:
   0.079*0.4*0.95=0.03

START^Patient_data^Conclusion:
   0.079*0.05*0.05=0.0001975

As indicated above, a section following itself is preferably allocated a probability of 0.4. Normalizing, and eliminating low probability paths, the process leaves two alternative labelings of the first two paragraphs:

START^Opening-words^Patient_data:
   0.921*1.0*0.95=0.96685

START^Patient_data^Patient-data:
   0.079*0.4*0.95=0.03315

The method of determining how adjacent paragraphs are joined together as a single section is illustrated in the last example. In the preferred labeling of a sequence of paragraphs, two successive paragraphs are assigned the same label, "Patient_data," however the Functional Labeler designates them as a single section.

An example of a labeled document is shown graphically in FIG. 9.

Syntactic Parsing

According to another embodiment of the present invention, concept extraction from text is performed subsequent to a complete syntactic parse 90 of each sentence to indicate the degree of relatedness between different terms in the sentence. Constituency-based grammar is a common grammar formalism used in the industry for syntactic parsing. However, constituency-based grammar groups words into larger units and relies on establishing a hierarchical structure of grammar groups in a sentence or unit of text in order to establish the relationship between words or terms in a sentence.

According to a preferred embodiment of the present invention, syntactic parsing 90 is performed using dependency grammar that relates each word to another word directly, rather than to a higher level unit. Dependency grammar parsing of a sentence is illustrated as follows:

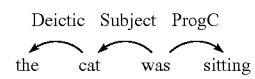

A bottom-up chart-parser using a statistically-ordered agenda is used to syntactically parse 90 free text. A bottom-up parsing algorithm determines how each word can join to other words as a dependant, rather than exploring what dependants each word can take. The resulting sequences of words are stored in a chart. Any untried relations between words are stored in a statistically-ordered agenda. The agenda allows the parser to stop when a parse covering an input free text string is produced, rather than requiring all possible analyses to be produced before termination. The agenda statistically orders proposed links. For instance, in "the orange cat sat", a small grammar allows the following connections between the words:

"the"→"orange" (as a noun)
"the"→"cat"
"orange" (noun)→"cat"
"orange" (adjective)→"cat"
"orange" (noun)→"sat"
"cat"→"sat"

According to the grammar above, there are two possibilities for connecting the term "the" and three for connecting the term "orange." The term "cat" can only connect to "sat," and "sat" must be the head of the clause.

A nonstatistical parser would add each of these possible links to the chart in the order they are encountered. According to the present system and method, the statistical parser orders the alternative links in order of their likelihood of being correct. The estimation of likelihood is derived using statistical measures including distribution of alternative senses, word patterns, and lexical distance between words. These measures generate the statistical links.

The distribution of alternative senses in a corpus of text is used to estimate the statistical measure for how often words occur in different senses. For example, in a particular text corpus, the term "orange" may occur as an adjective 90% of the time, and as a noun 10% of the time.

Word patterns may be derived from human analysis of grammatical patterns. For example, a noun may attach itself to a verb as a subject 50% of the time, and to another noun 10% of the time in grammatical patterns. Applying this measure to the phrase above, the links for connecting the term "orange" as a noun would, free of other factors, prefer to link to the verb "sat" than to the noun "cat." According to one embodiment of the present invention, a corpus of human-derived grammatical parses are used to generate a statistical word pattern measure.

Lexical distance is also a statistical measure. The lexical distance between two words is used to generate a statistical probability of a relationship between the words. The greater the distance between two words, the lesser the likelihood that the words are related. For example, using the sentence above, the term "orange" as a noun is more likely syntactically connected to the term "cat" than to the term "sat."

According to an embodiment of the present invention, the probabilities from statistical measures such as alternative sense distribution, human-derived grammatical patterns, and lexical distance, are combined to estimate the probability for each syntactic link in the agenda. The links in the agenda are then applied to the text in the order of their strength. Note that a link with high probability may not be used in the final parse if it does not lead to a syntactically correct parse of the sentence as a whole. For instance, linking "orange" as a noun to "sat" may be rated syntactically higher than linking it to "cat", but this link will not lead to a valid parse of the set of words as a whole.

Figure 10:
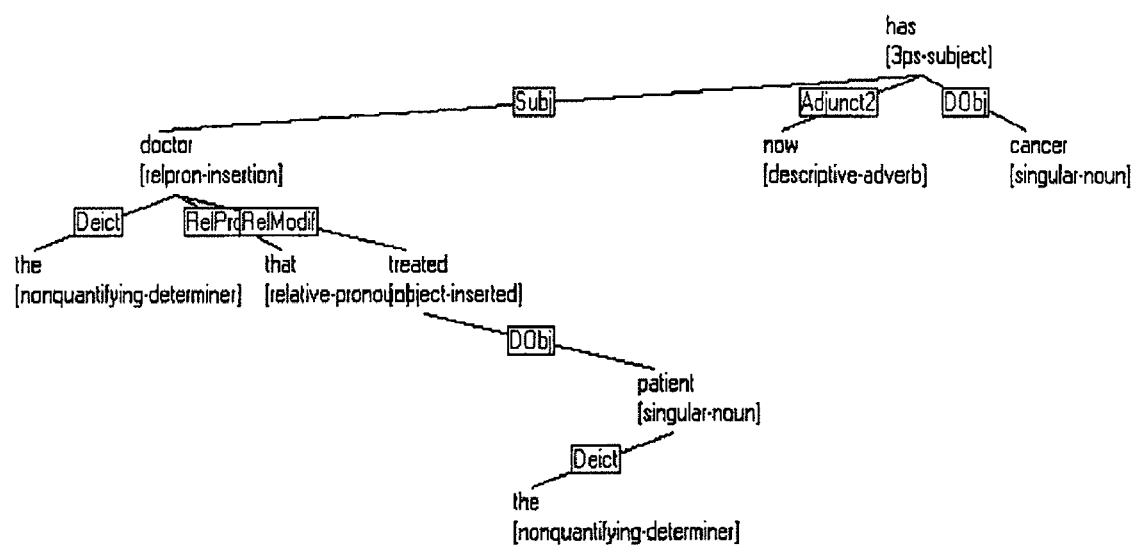
FIG. 10 illustrates syntactic parsing of a sentence.

The results of a syntactically parsed sentence "The doctor that treated the patient now has Cancer" illustrating the probabilities and statistical links generated using a combination of statistical measures is provided in FIG. 10.

By using the syntactic parser, the conceptual relationship between terms in the sentence is realized. Although "the patient" and "has cancer" occur in close proximity, the system might assume that the patient has cancer. However, it can be seen from the syntactic tree that the real relationship is between the doctor and cancer. Syntactic distance, illustrated by the number of lines or "links" separating two terms is more important than lexical distance.

Concept Extraction

Concept extraction effectuates text indexing and coding, as well as free text querying. A routine analyzes words in a sentence in order to find the best conceptual relationships between concepts corresponding to those terms. In a preferred embodiment, concept extraction 100 follows functional segmentation 80, as illustrated in FIG. 5. In a more preferred embodiment, concept extraction 100 follows syntactic parsing 90, as illustrated in FIG. 10.

According to one embodiment of the present invention, concept extraction 100 may occur in two steps. Terms in the text are matched with corresponding concepts in the formal ontology. The concepts of the text are fed into a spreading activation program which finds the most relevant concepts associated with the set of input concepts using the links in the formal ontology and creates a relevance ranking output according to those concepts associated with the text and related concepts that are not present in the text but are conceptually present in the text.

According to one aspect of the present invention, each text segment to be analyzed is processed in turn, building up a list of concepts for the segment. A simple-term mapping routine checks each term in the segment for corresponding concepts in the database. If found, the concept is added to a concept list for that text segment. A multiple-term mapping routine looks for sequences of words in the segment which correspond to a multi-word term in the database. The concept(s) associated with the term is assigned.

In accordance with the scope of the present invention, a simple term or multi-word term might correspond to multiple concepts. In such cases, all concepts that correspond to a term are added to the respective sentence concept list and the concepts are indicated as alternatives. Preferably, the spreading activation routine generates a concept list in which one of the alternatives is automatically selected.

According to one embodiment of the present invention, concepts are extracted from the formal ontology using a routine that adds concepts (including alternatives when more than one concept may correspond to a term) to a conceptual graph. First, the concept extraction 100 routine finds all concepts directly corresponding to terms in the text. Those concepts are added to the graph. All parent concepts are also added to the graph. Links based on statistical analysis of the concepts corresponding to the terms in the text, and concepts that correspond to terms in the text, such concepts which are immediate or once-removed neighbors, are added to the graph. Formal ontology hierarchical links are also used to locate concepts that are represented by the text being analyzed and those links are added to the graph. After all related concepts and links are stored in the graph, an intersection routine calculates the distance between the concepts using the formal ontology hierarchical links, in order to store the top-ranked intersection to the graph.

Once a graph is built for the entire text being analyzed, a spreading activation algorithm is initiated that will follow the formal ontology paths to generate relevance values for each concept extracted for the text.

The concepts with the highest relevance values are selected as the concepts contained within the section and stored in indexes in database format and attached to the texts. Alternatively, all concepts extracted for the text being analyzed may be stored in an index. This data may be stored in any machine-readable text format, and indices are available for searching when users want to retrieve documents. Each index points to the text or document from which it was derived or to which it relates.

An advantage of the method according to the invention that extracted concepts may not even appear in the text, but be recovered as the intersection of other extracted/mentioned concepts.

According to another embodiment of the present invention, syntactic parsing precedes concept extraction, which reduces the number of ambiguous concepts that pass to the concept extractor. For example, in "The tourniquet will stem the blood flow," two concepts may correspond to the term "stem;" one corresponding to "stem" as a verb and one as a noun. With syntactic parsing 90 preceding concept extraction 100, as illustrated in FIG. 5, the use of the term "stem" as a verb in the sentence is recognized, and only one concept corresponding to this term is passed to the concept extractor. The syntactic parse is thus used to set the initial values in the semantic graph used in the spreading activation routine.

The foregoing illustrations of embodiments of the present invention are offered for the purposes of illustration and not limitation. It will be readily apparent to those skilled in the art that the embodiments described herein may be modified or revised in various ways without departing from the spirit and scope of the invention. The scope of the invention is to be measured by the appended claims.

What is claimed is:

1. A computer-readable storage medium storing code representing instructions that when executed by a computer cause the computer to:

receive as an input at least a portion of a document;

extract a meaning contained in the portion of the document based on a comparison of the portion to a plurality of concepts included in a computer implemented formal ontology and arranged in a hierarchy, said hierarchy having a primary concept defined based on a set of criteria, each concept from the plurality of concepts hierarchically linked to a concept below the primary concept being defined based on all criteria from the set of criteria and based on at least one additional criterion different than each criterion from the set of criteria;

associate a first term from the document with a first concept from the plurality of concepts;

associate a second term from the document with a second concept from the plurality of concepts;

prohibit a link between the first term and the second term when a link between the first concept and the second concept is prohibited based on a link between a parent concept of the first concept and a parent concept of the second concept, the link between the first concept and the second concept being a substantially similar type as the link between the parent concept of the first concept and the parent concept of the second concept; and index the portion of the document based on said meaning extracted from the portion of the document.

2. A computer-readable storage medium as defined in claim 1, wherein the link between the first concept and the second concept, and the link between the parent concept of the first concept and the parent concept of the second concept, are ancestrally linked.

* * * * *